(12) United States Patent  (10) Patent No.: US 8,479,623 B2
Bridges  (45) Date of Patent: Jul. 9, 2013

(54) COOKED BACON SLICER

(75) Inventor: Darwin E. Bridges, Oak Creek, WI (US)

(73) Assignee: Patrick Cudahy, Inc., Cudahy, WI (US)

( * ) Notice: Subject to any disclaimer, the term of this patent is extended or adjusted under 35 U.S.C. 154(b) by 820 days.

(21) Appl. No.: 12/364,003

(22) Filed: Feb. 2, 2009

(65) Prior Publication Data

US 2010/0192743 A1  Aug. 5, 2010

(51) Int. Cl.
 *B26D 7/06* (2006.01)
(52) U.S. Cl.
 USPC .................................. 83/13; 83/506; 83/932
(58) Field of Classification Search
 USPC ............... 83/505, 506, 507, 932, 422, 425, 83/425.2, 425.3, 426, 431, 436.3, 435, 435.2, 83/436.8, 13
 See application file for complete search history.

(56) References Cited

U.S. PATENT DOCUMENTS

| 1,976,825 A | | 10/1934 | Ahrndt |
| 2,241,650 A | * | 5/1941 | Spang ............................. 83/873 |
| 2,321,299 A | * | 6/1943 | Johnson .......................... 83/491 |
| 2,839,113 A | | 6/1958 | Townsend |
| 3,555,945 A | * | 1/1971 | Warthen ........................... 83/56 |
| 3,880,035 A | | 4/1975 | Divan |
| 3,985,052 A | | 10/1976 | Balch et al. |
| 4,041,822 A | | 8/1977 | Gabel |
| 4,116,203 A | | 9/1978 | Wochnowski |
| 4,129,053 A | | 12/1978 | Kent |
| 4,557,019 A | | 12/1985 | Devanter et al. |
| 4,868,951 A | | 9/1989 | Akesson et al. |
| 4,960,021 A | * | 10/1990 | Carney et al. .................... 83/120 |
| 5,481,466 A | | 1/1996 | Carey |
| 5,482,502 A | | 1/1996 | Hjorth |
| 5,735,184 A | * | 4/1998 | Miller et al. .................... 83/504 |
| 5,996,460 A | | 12/1999 | Waite |
| 6,882,434 B1 | | 4/2005 | Sandberg |
| 7,163,038 B2 | | 1/2007 | Rhodes |
| 7,428,858 B2 | | 9/2008 | Owens |
| 2003/0031767 A1 | | 2/2003 | Leitinger |
| 2008/0257123 A1 | | 10/2008 | Williams |

FOREIGN PATENT DOCUMENTS

| EP | 0 429 711 | 6/1991 |
| EP | 1 920 658 | 5/2008 |
| GB | 2 352 675 | 2/2001 |
| WO | 01/32369 | 5/2001 |
| WO | WO 2008/079332 | 7/2008 |
| WO | WO 2009/014778 | 1/2009 |

OTHER PUBLICATIONS

International Search Report for International Application No. PCT/US2008/061159, mailed Aug. 29, 2008.
Written Opinion for International Application No. PCT/US2008/061159, mailed Aug. 29, 2008.

(Continued)

*Primary Examiner* — Stephen Choi
(74) *Attorney, Agent, or Firm* — Hunton & Williams LLP

(57) ABSTRACT

A system and method for slicing and separating a food product into two pieces is described, where the system and method employ a pneumatically controlled cutting mechanism to slice and separate the food product.

11 Claims, 9 Drawing Sheets

OTHER PUBLICATIONS

USPTO Communication mailed Mar. 19, 2009 in U.S. Appl. No. 11/845,382; Confirmation No. 8629; 6 pgs.

PCT Notification of Transmittal of The International Search Report and The Written Opinion of the International Searching Authority, or the Declaration (PCT/ISA/220) for PCT/US2010/022806; mailed Mar. 31, 2010; 1 page.

PCT International Search Report (PCT/ISA/210) for PCT/US2010/022806; mailed Mar. 31, 2010; 3 pages.

PCT Written Opinion of the International Searching Authority (PCT/ISA/237) for PCT/US2010/022806; mailed Mar. 31, 2010; 5 pages.

Extended European Search Report for EP 10736555.3, mailed Apr. 24, 2013.

* cited by examiner

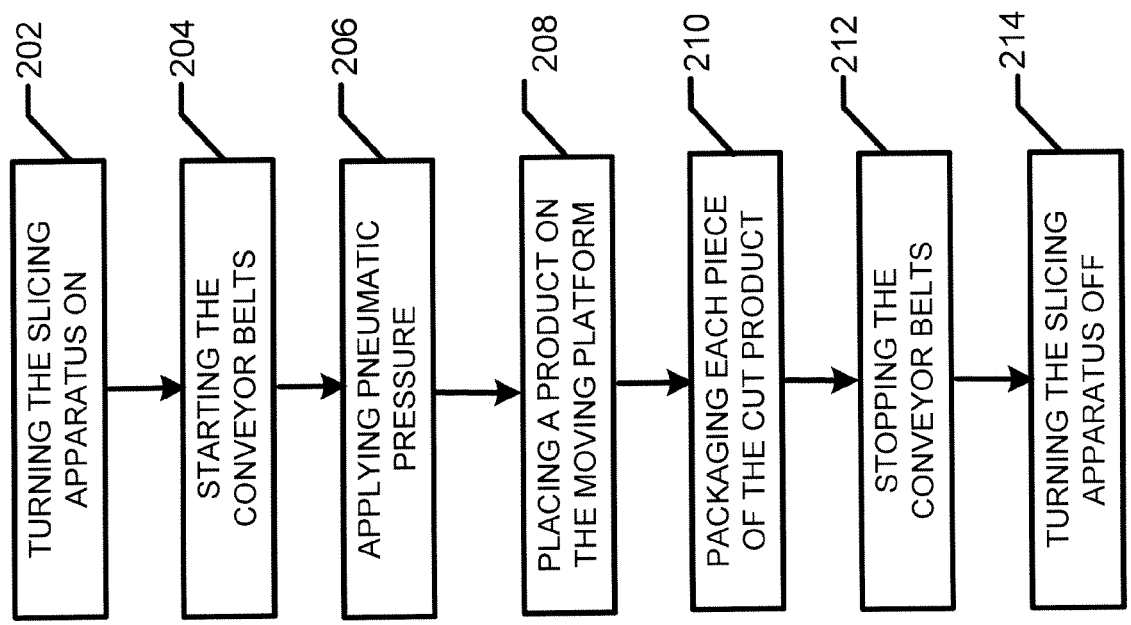

COOKED BACON SLICER

CROSS-REFERENCE TO RELATED APPLICATIONS

This patent application is related to U.S. patent application Ser. No. 11/845,382, filed Aug. 27, 2007, which is hereby incorporated by reference herein in its entirety.

BACKGROUND INFORMATION

Food packagers may sell products, such as cooked bacon to restaurants, e.g., fast-food restaurants. The restaurants may use portion sized products such as the bacon on sandwiches. In order to save time, the products, such as bacon, may be cut (e.g., in half) thereby saving an employee time of having to cut the product when preparing a meal. In preparing food in the food service industry, saving time may be a serious concern. In the fast-food restaurant industry, where time is important and the demand for portion sized products, such as bacon, may be high, cutting bacon may waste valuable time. These and other drawbacks exist with current systems.

BRIEF DESCRIPTION OF THE DRAWINGS

Purposes and advantages of the exemplary embodiments will be apparent to those of ordinary skill in the art from the following detailed description in conjunction with the appended drawings in which like reference characters are used to indicate like elements, and in which:

FIG. 9 is a flow diagram of a method for using a slicing apparatus in accordance with an exemplary embodiment of the present disclosure.

Figure 1:
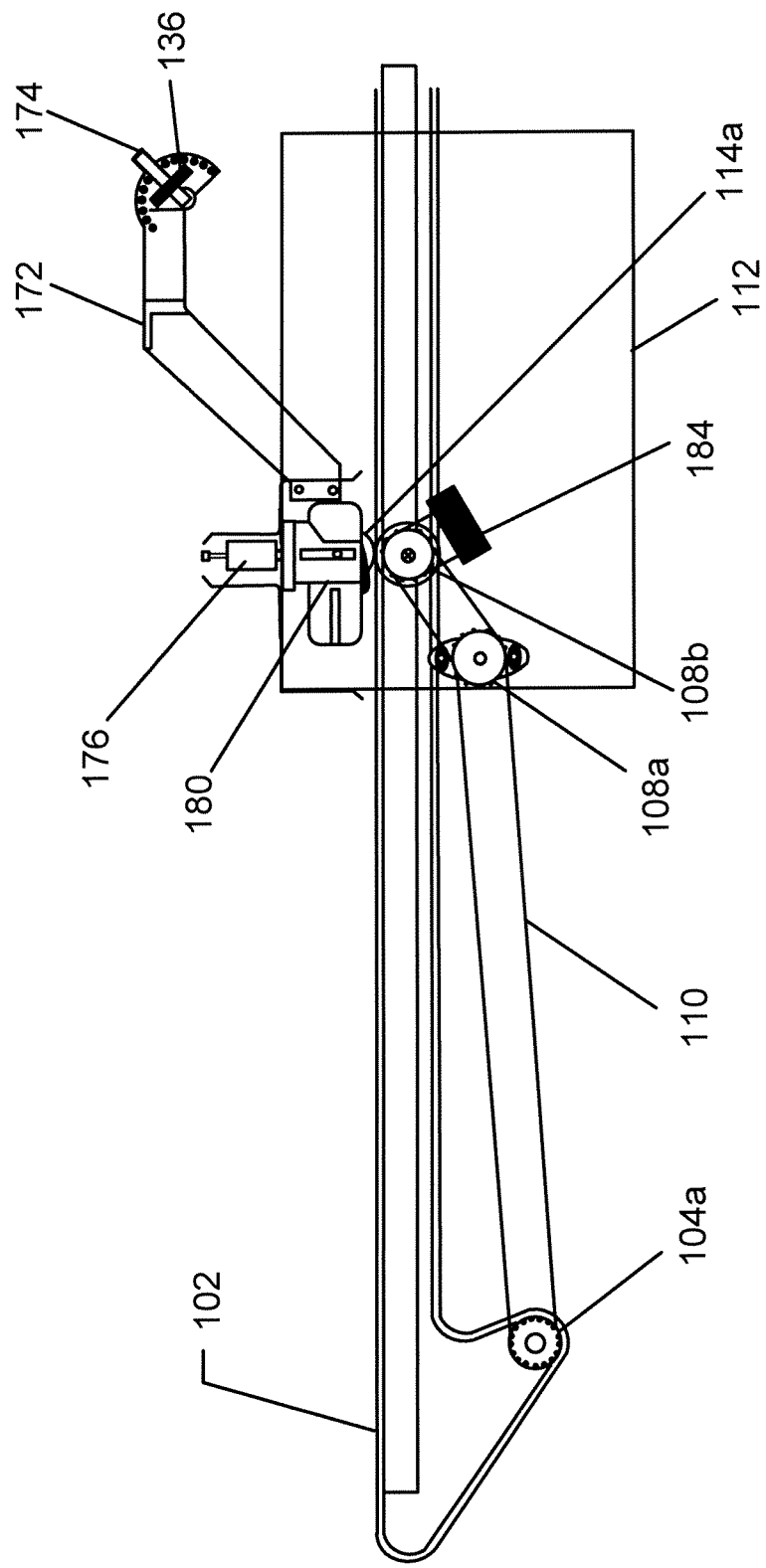
FIG. 1 is a schematic of a slicing apparatus in accordance with an exemplary embodiment of the present disclosure.

These and other embodiments and advantages will become apparent from the following detailed description, taken in conjunction with the accompanying drawings, illustrating by way of example the principles of the various exemplary embodiments.

DETAILED DESCRIPTION OF EXEMPLARY EMBODIMENTS

A slicing apparatus in accordance with exemplary embodiments of the present disclosure may include two or more sets of conveyor belts for receiving a product to be cut or separated in half, a motor for driving the conveyor belts and moving the product through a pneumatically adjustable cutting mechanism thereby separating the product into two pieces. The product may rest on a product carrier, such as interleaver paper, a styrofoam tray, or other carrier. The carrier may be placed across both conveyor belts. The pneumatically controlled cutting mechanism may be aligned with a space between the belts. A cutting roller or other cutting surface having a top height approximately equal to the belts may be positioned between the belts beneath the pneumatically controlled cutting mechanism. The cutting roller or other cutting surface may provide an opposing surface enabling the cutting mechanism to use pressure to separate the product. The pneumatically controlled cutting mechanism may apply sufficient pressure to separate the product without separating the product carrier. A safety enclosure may enclose the cutting mechanism. One or more markings may be used to indicate where the product should be placed on the conveyor belts to assist in ensuring that the product is cut into two horizontally even pieces. One or more air jets may facilitate the cleaning and performance of a cutting mechanism. A control panel may be used to start and stop the conveyor belts as well as adjusting the speed of the motor for driving the conveyor belts.

According to one or more embodiments, utilizing the pneumatically controlled cutting mechanism may provide several advantages over other methods. For example, in one or more embodiments, a slicing apparatus may slice products after cooking. In other methods, slicing products prior to cooking may lead to dissimilar appearances between the two sliced portions after cooking. Because product portions may not cook uniformly, the product portions may be unequal sizes after cooking. Additionally, in other methods, slicing products earlier on in a process, such as before cooking, may also create smaller product portions which may be more difficult for a process to handle. For example, in other methods, slicing products prior to placing them on interleaver paper or other carriers, may lead to the smaller products being damaged when placed on interleaver paper or other carriers. Moreover, other methods of preparing food products may use cutting mechanisms which may cut, separate, or otherwise damage interleaver paper or other carriers. According to an exemplary embodiment of the present disclosure, pneumatically controlled cutting mechanisms may be aligned over a cutting surface and may apply sufficient pressure to separate a product, such as, for example, cooked bacon, into two separate pieces of equal length. Such a pneumatically controlled cutting mechanism may separate a product without damaging a product carrier, such as interleaver paper. This may facilitate product handling, improve sanitary handling of products and provide other advantages.

Referring to FIGS. 1-4, a slicing apparatus for cutting or slicing a product into two pieces in accordance with an exemplary embodiment of the present disclosure is illustrated. The slicing apparatus 100 may include one or more of the following: a moving platform assembly, a motor assembly, a cutting assembly, a controller assembly, an air delivery system, a pneumatic control system, and a frame assembly. The description below describes the assemblies of the slicing apparatus 100. It is noted that these assemblies are exemplary. The assemblies, or components of an assembly, may be combined, integrated, divided, and/or separated into one or more assemblies or sub-assemblies.

Figure 3:
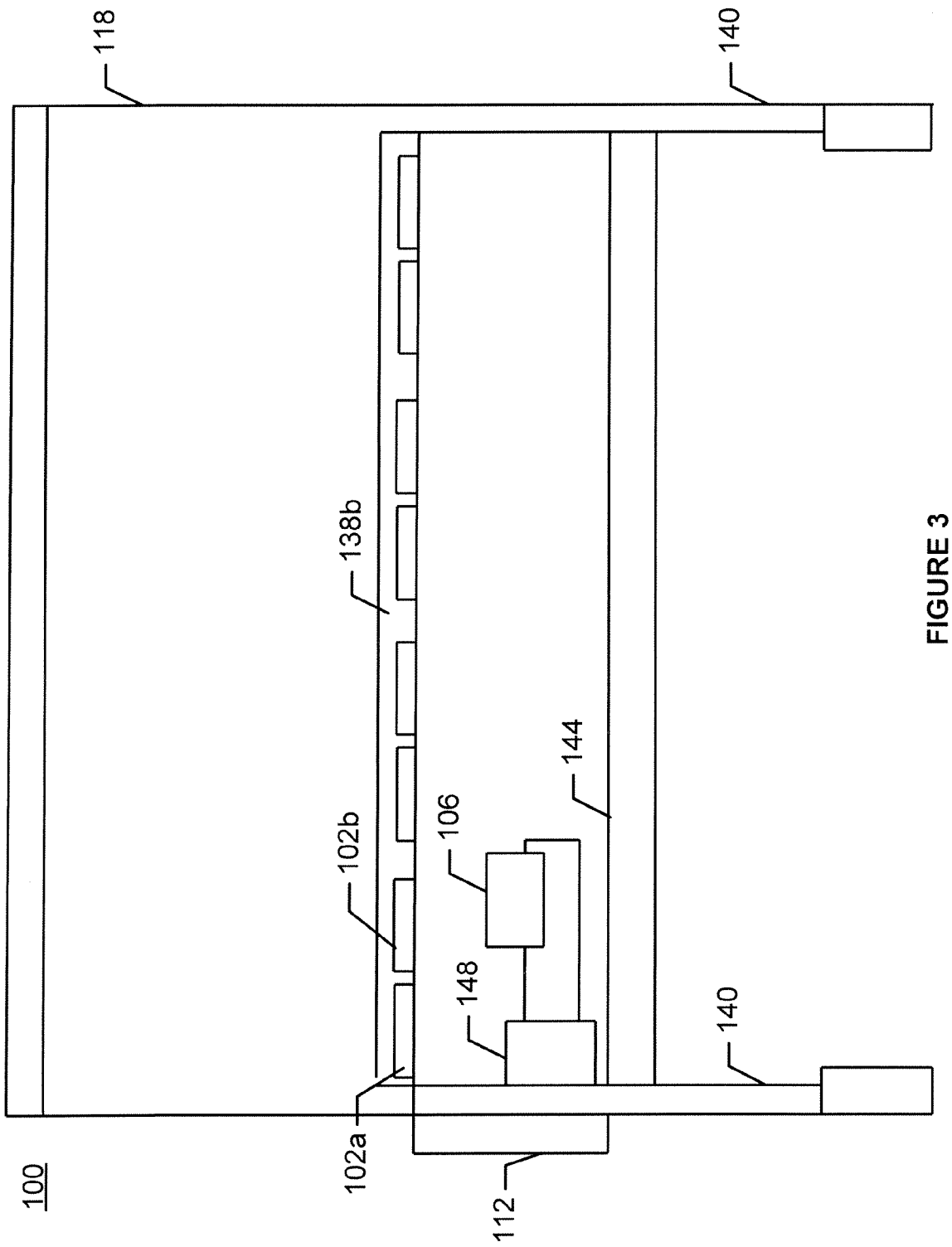
FIG. 3 is an end view of a slicing apparatus in accordance with an exemplary embodiment of the present disclosure.

The moving platform assembly may include one or more conveyor belts 102. As shown in FIG. 3, in one configuration, the moving platform assembly may include four sets of two conveyor belts 102a and 102b. The conveyor belts 102a and 102b may be Intralox 1100 Series Belting, which is manufactured by Intralox headquartered in New Orleans, La. In one or more embodiments, the moving platform assembly may use rollers, skate wheel conveyors, ball transfer tables, a metal mesh belt, a polyester belt or other materials handling systems. In an exemplary embodiment, each conveyor belt 102 may have the following dimensions: four inches wide and providing a twenty foot long conveyor length. The conveyor belts 102a and 102b may be side by side and may be positioned to receive a product at a first end, move the product through the cutting assembly and output the resulting products at a second end. In an exemplary embodiment, the slicing apparatus 100 may provide eight employee workstations (e.g., one employee at each end of four sets of belts). Each set of belts 102a and 102b may be positioned between one or more guide rails 190, which may be composed of Ultra high molecular weight polyethylene (UHMWPE) or other wear resistant material.

For example, the conveyor belts 102a and 102b may receive a product, such as, but not limited to, a single slice of bacon or a shingle or sheet of bacon at an infeed end of the conveyor belts 102a and 102b, move the bacon through the cutting assembly and provide the two halves of bacon at an outfeed end of the conveyor belts 102a and 102b. For example, a shingle of bacon may comprise fifty (50) slices of bacon which are stacked on top of one another, e.g., as seen in grocery stores. A sheet of bacon may be a plurality of sliced bacon similar to the bacon one may purchase at the grocery store. Typically, the bacon run through the slicing apparatus 100 is cooked, however the bacon may be uncooked or partially cooked.

The moving platform assembly may include one or more rollers 104 for assisting in the movement of the conveyor belts 102. As shown in FIG. 3, the slicing apparatus 100 may include three bottom rollers 104a, 104b, 104c. The rollers 104a, 104b, and/or 104c may be, for example, an Ultra High Molecular Weight Polyethylene roller, such as a polyoxymethylene roller, a Delrin roller or another polyacetal roller. The rollers 104a, 104b, and/or 104c may be made of other materials, such as materials approved by the U.S. Food and Drug Administration ("FDA") for use in the food industry. The rollers 104a, 104b, and/or 104c may be knurled rollers, ringed rollers, ridged rollers, or rollers containing other patterns improving traction. In one or more embodiments, the rollers may be smooth rollers. In an exemplary embodiment, the rollers 104a, 104b, and/or 104c may be one inch (1") in diameter. Other diameters may be used. First and second bottom rollers 104a and 104b may be positioned at about each end of the conveyor belts 102. A third bottom roller 104c may be interposed between the first and second bottom rollers 104a and 104b. The third bottom roller 104c may be a driven roller or driven sprocket (e.g., a driven Delrin bottom roller). The third bottom roller 104c may be driven by the motor assembly. According to one or more embodiments, a single motor assembly may power a plurality of sets of belts 102a and 102b. The plurality of sets of belts may be regulated together (e.g., a single speed controller or on/off controller may control functionality for all belts). Also, sets of belts 102a and 102b may be controlled by a plurality of controllers. Speed of individual sets of belts 102a and 102b may use a clutch or other mechanism to enable individual engagement and disengagement of motor 106 from a set of belts. In one or more embodiments, a plurality of motor assemblies may be utilized, for example, a motor assembly may be dedicated to each set of belts 102a and 102b.

The motor assembly may include a motor 106 to drive the moving platform assembly. The motor 106 may be a direct current (DC) motor and/or may be a variable speed DC motor, such as, but not limited to, a ninety volt direct current (90 VDC) Washdown duty generator. The motor 106 may include a motor guard (not shown) substantially covering the motor 106. The motor guard may assist in keeping foreign objects, such as but not limited to dirt, dust, and fingers, away from the motor 106. The motor 106 may drive the third bottom roller 104c which in turn may drive the conveyor belts 102a and 102b. The motor 106 may be coupled to the conveyor belts 102a and 102b.

Figure 2:
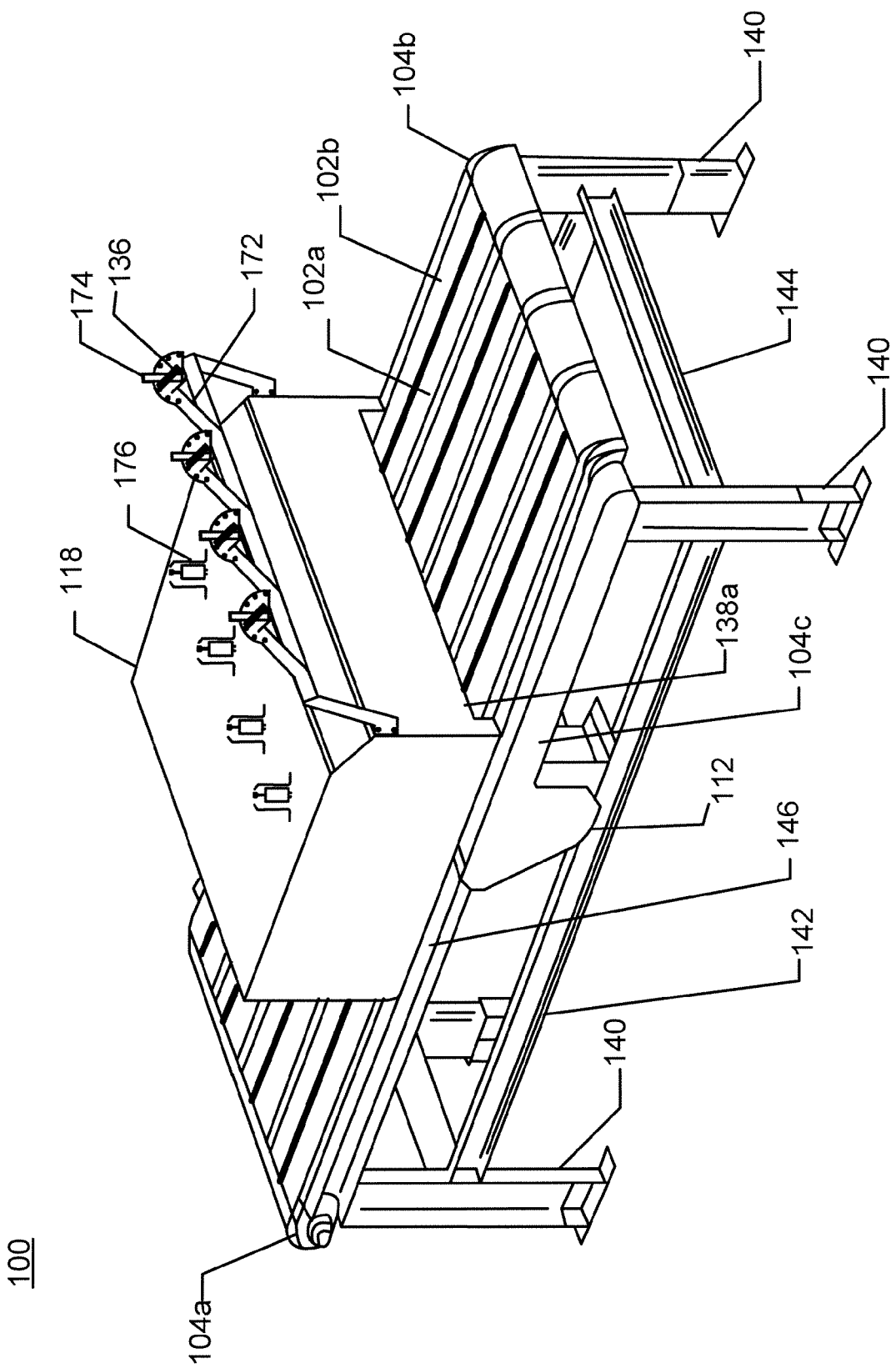
FIG. 2 is a perspective view of a slicing apparatus with a safety enclosure in accordance with an exemplary embodiment of the present disclosure.
Figure 4:
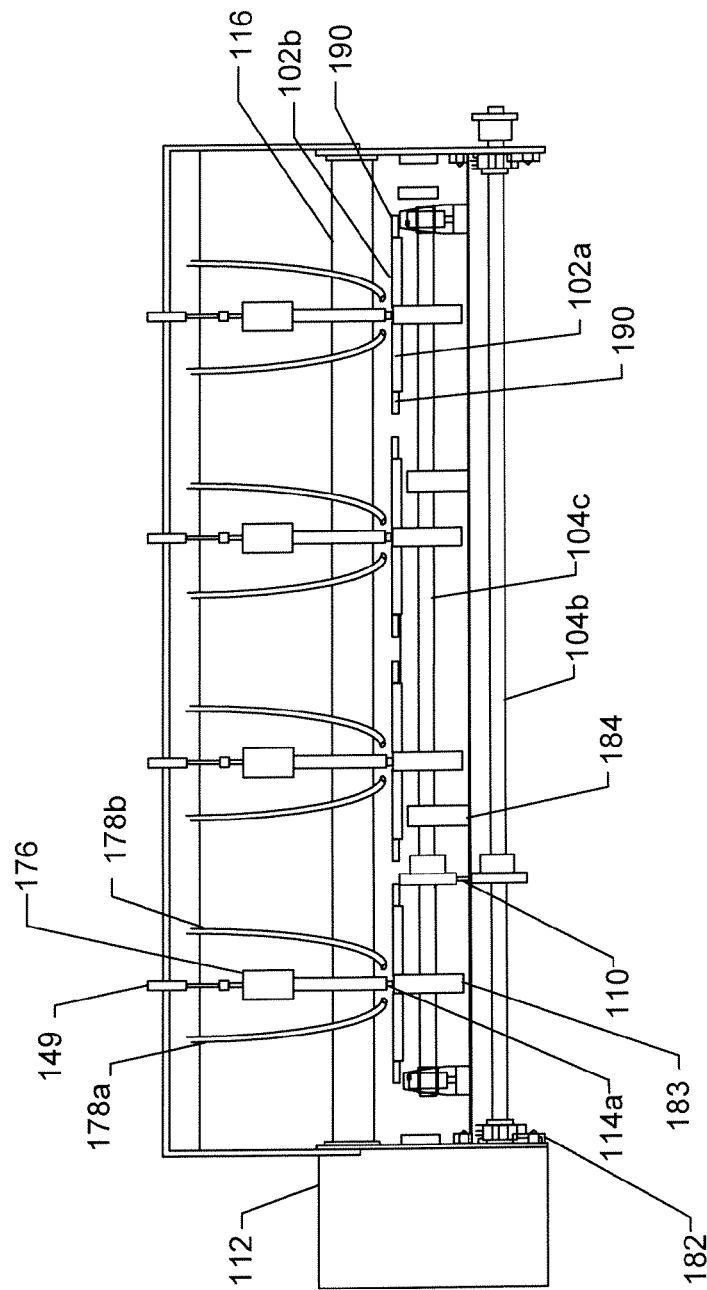
FIG. 4 is a view of a slicing apparatus in accordance with an exemplary embodiment of the present disclosure.

For example, the motor 106 may include a pulley or a drive sprocket 108a, the third driven bottom roller 104c may include a pulley or a driven sprocket 182 and a belt 110 (e.g., a pulley belt, or a chain), which may connect the pulleys 108a and 108b as shown in FIGS. 1 and 4. Thus, the motor 106 may drive the attached pulley 108a which in turn may drive the belt 110. The belt 110 may drive the pulley 108b attached to the third driven bottom roller 104c, which in turn may drive the conveyor belts 102a and 102b. As shown in FIGS. 1 and 2, a safety guard 112 may cover the pulleys 108 and the belt 110. The safety guard 112 may assist in keeping foreign objects, such as but not limited to dirt, dust, and fingers, away from the pulleys 108 and belt 110. In an exemplary embodiment, the sprocket size may be four inches in diameter with a one and a quarter (1¼) inch bore.

The safety enclosure 118 may assist in preventing a worker from accidentally being injured by the cutting mechanism 180. The safety enclosure 118 may be a lexan safety enclosure. The safety enclosure 118 may be made of wire cloth brand welded lock and crimp style stainless steel wire mesh. The safety enclosure 118 may also be made of stainless steel or other durable materials. The safety enclosure 118 may form openings 138a and 138b (e.g., the area between the top surface of the conveyor belts 102a and 102b and the bottom of the safety enclosure 118) at the sides or ends in which the product enters and exits under the safety enclosure 118 (e.g., the sides facing the conveyor belts 102). As shown in FIG. 2, a first opening 138a may be located on the input side of the safety enclosure 118 (e.g., the side where the product to be sliced enters the safety enclosure 118). The first opening 138a may be approximately one and a half inches (1.5") tall vertically from the top surface of the conveyor belts 102a and 102b and the bottom of the safety enclosure 118. As shown in FIG. 3, a second opening 138b may be located on the output side of the safety enclosure 118 (e.g., the side where the sliced product exits the safety enclosure 118). The safety enclosure 118 may include securing mechanisms (not shown) to secure the safety enclosure 118 in a set position, e.g., to the frame of the slicing apparatus 100. The securing mechanisms may be gas springs enclosed within the safety enclosure 118. The safety enclosure may include one or more handles which may assist a user in positioning and removing the safety enclosure 118.

The conveyor belts 102a and 102b may include one or more markings (not shown) to indicate where the product should be placed. According to a first embodiment, the markings may serve as a left and right boundary. For example, each of the conveyor belts 102a and 102b may include lines indicating a left boundary and a right boundary. According to one or more embodiments, markings may indicate a center line aligned with counterbalanced top cutter wheel 114a. In one embodiment, the slicing apparatus 100 may include one or more lasers 136 to provide the markings. The lasers 136 may emit a light, visible to the human eye, that is projected onto each of the conveyor belts 102a and 102b, thereby marking a left boundary, a right boundary, and/or a center boundary. The one or more lasers 136 may be turned on with the power controller 122. The lasers 136 may be mounted to the safety enclosure 118. According to one or more embodiments, the lasers 136 may be mounted on one or more adjustable mountings 174 attached to swinging support arms 172. Adjustable mountings 174 may enable the adjustment of laser 136 in a range of one hundred and eighty degrees or more. Adjustable mountings 174 may enable markings to be displayed on different portions of the belt according to a worker preference, a belt speed, a product type, or other factors.

The slicing apparatus 100 may include a frame assembly. The frame assembly may allow the slicing apparatus 100 to be self standing. The frame assembly may include four vertical legs 140, two horizontal cross members 142, two width cross members 144, and two horizontal support members 146 (collectively the "frame") as shown in FIGS. 2 and 3. The other assemblies may be coupled to the frame via one or more support members. For example, as shown in FIG. 3, a motor support member 148 may support the motor 106 and be coupled to at least one of the horizontal cross members 142. The moving assembly may be coupled to the horizontal support members 146. The cutting mechanism support member 116 may be coupled to the horizontal support members 146. The safety enclosure 118 may be coupled to the cutting mechanism support member 116 and/or to the horizontal support members 146. The frame may be made of stainless steel or other suitable material. Preferably the frame (and the support members 116, 146, and 148) may be made of a material that is sanitary for use with food products.

The slicing assembly 100 may include the cutting assembly for cutting or slicing a product on the moving platform into two pieces. The cutting assembly may include a cutting mechanism 180 and a cutting mechanism support frame 116. The cutting mechanism 180 may be supported by the cutting mechanism support frame 116 which may attach to the frame of the slicing apparatus 100. The cutting mechanism 180 may be, for example, a knife, a saw, a blade, or any other object that may cut through a product or separate a product, such as bacon. The cutting mechanism 180 may be a counterbalanced top cutter wheel 114a. The counterbalanced top cutter wheel 114a may be a round cutting blade (e.g., about 3.25 inches in diameter) with a relatively dull blade. The counterbalanced top cutter wheel 114a may be composed of carbon steel. The counterbalanced top cutter wheel 114a may have a beveled edge, such as a 33 degree beveled edge. The counterbalanced top cutter wheel 114a may be adjusted in the vertical direction to cut through the product, but not through a carrier carrying the product. For example, the product may be placed on a carrier, such as, but not limited to, paper, interleaver paper, a foam tray, or a cutting board, with the counterbalanced top cutter wheel 114a cutting through the product and against, but not through, the carrier.

In one or more embodiments, the cutting mechanism 180 may apply pneumatically controlled pressure to the top cutter wheel 114a. The pneumatically controlled pressure may adjust the force with which the top cutter wheel 114a presses down on the product. As discussed in greater detail below with reference to FIG. 5, pneumatically controlled pressure may be adjustable for one or more cutting mechanisms 180. Pneumatic pressure may be supplied by one or more pneumatic valves 176 which may be operatively connected to pneumatic air conveyance 149. Pneumatic valves 176 may enable the setting and/or release of individual pneumatic pressure for one or more cutting mechanisms 180.

As shown in FIG. 4, the cutting mechanism 180 may be positioned at an opening between the two conveyor belts 102a and 102b such that when the conveyor belts 102a and 102b moves the product from one end to the other end of the conveyor belts 102a and 102b, the cutting mechanism 180 may cut or slice through the product. The cutting mechanism 180 may position the counterbalanced top cutter wheel 114a over cutting roller 183. Cutting roller 183 may be positioned between conveyer belts 102a and 102b and may provide an opposing surface for the counterbalanced top cutter wheel 114a. Cutting roller 183 may be an Ultra High Molecular Weight (UHMW) polyethylene roller, such as a polyoxymethylene roller, a Delrin roller or another polyacetal roller. Cutting roller 183 may be made of other materials, such as materials approved by the U.S. Food and Drug Administration ("FDA") for use in the food industry. Cutting roller 183 may be a knurled roller, a ringed roller, a ridged roller or other rollers improving traction. In one or more embodiments, cutting roller 183 may be a smooth surfaced roller. According to one or more embodiments, cutting roller 183 may provide a pinch point against the counterbalanced top cutter wheel 114a for some products (e.g., cooked bacon) and such products may be split by pressure rather than sliced and/or cut. Such separation by pressure may prevent damage to a product carrier such as interleaver paper. Adjustable pneumatic pressure may enable a cutting mechanism to adjust for the thickness of a product or other product processing conditions.

As shown in FIG. 4, one or more cutting rollers 183 may be supported by roller 104c. Roller 104c may be supported by one or more blocks 184. Blocks 184 may be positioned on or part of a bar, shelf, or other surface (not shown) extending from one or more portions of the frame assembly. Roller 104c may be operatively connected to roller 104b by belt 110.

In one or more embodiments the counterbalanced top cutter wheel 114a may be driven by contact with cutting roller 183 or by pressure applied by product moving underneath the counterbalanced top cutter wheel 114a on conveyer belts 102a and 102b. According to one or more other embodiments, the counterbalanced top cutter wheel 114a may be connected or coupled by a belt, chain, or other linkage, such as belt 110, to rollers 104. In one or more embodiments, the counterbalanced top cutter wheel 114a may be independently driven via a separate linkage to motor 106 or via a linkage to an alternate drive mechanism.

According to one or more embodiments, the slicing apparatus 100 may contain one or more air conveyance systems, such as air jets 178a and 178b. Air jets 178a and/or 178b may be directed generally towards cutting mechanism 180 and/or counterbalanced top cutter wheel 114a. Air jets 178a and 178b may provide continuous or intermittent air streams which may facilitate cleaning product debris or other matter from cutting mechanism 180 and/or counterbalanced top cutter wheel 114a. Air jets 178a and 178b may also remove fragments of sliced or partitioned products from a product carrier.

In another embodiment, a single conveyor belt (not shown) may be used in conjunction with the counterbalanced top cutter wheel 114a with the conveyor belt serving as the carrier. A safety enclosure 118 may cover part of the cutting assembly.

Figure 5:
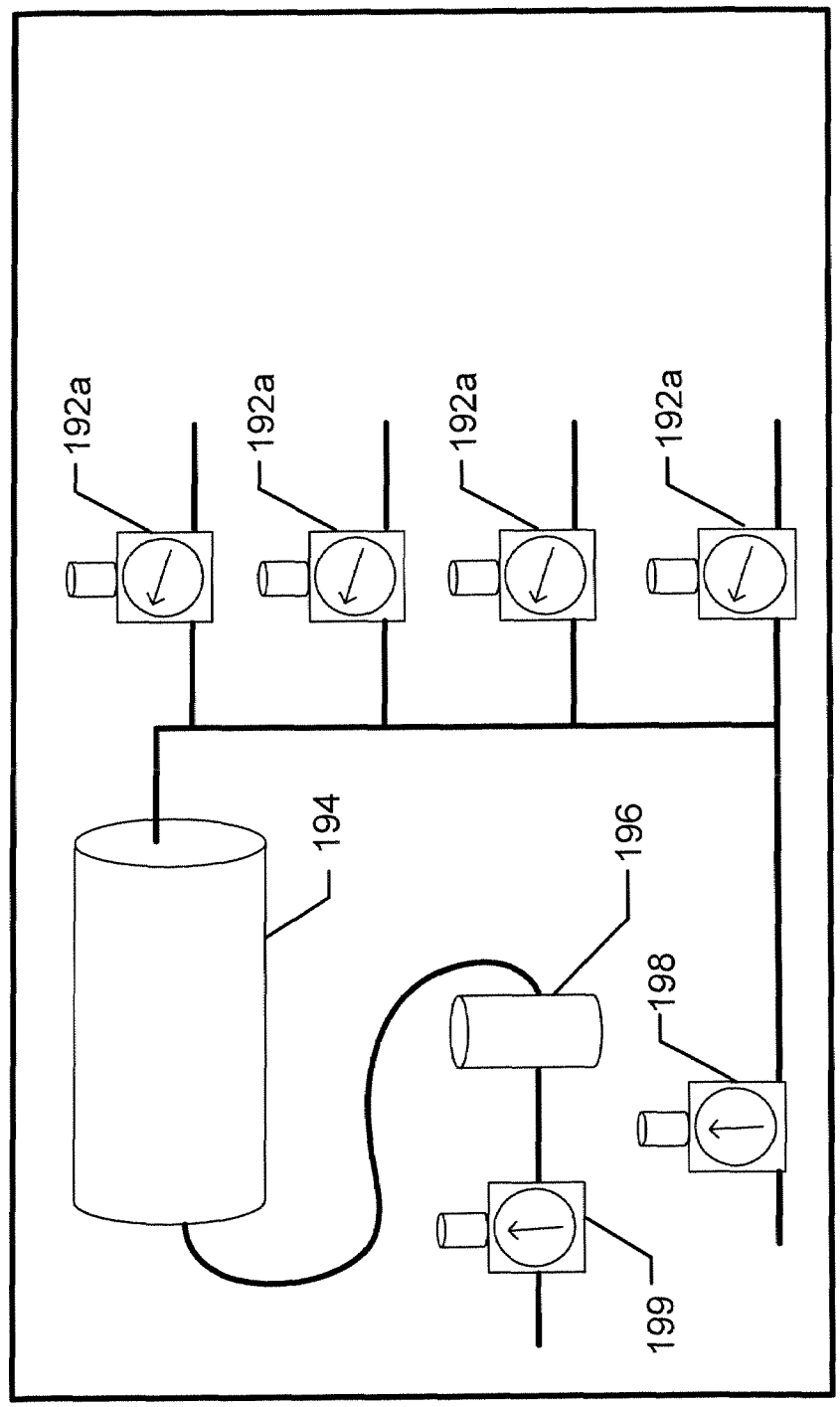
FIG. 5 is a pneumatic control assembly of a slicing apparatus in accordance with an exemplary embodiment of the present disclosure.

Referring to FIG. 5, a pneumatic control assembly of a slicing apparatus in accordance with an exemplary embodiment of the present disclosure is illustrated. A supply of primary pneumatic pressure may be received from a compressor or other source through primary gauge and control valve 199. Pneumatic reservoirs 196 and 194 may stabilize pneumatic pressure. Pneumatic gauges and controls 192a may monitor and control pressure to one or more cutting mechanisms 180. Pneumatic pressure may be adjustable increments, such as tenth of a pound increments. A plurality of pneumatic gauges and controls 192a may enable pressure of each cutting mechanism 180 to be monitored, set, and/or released individually. Pneumatic gauges and controls 192a may be connected via pneumatic air conveyance 149 to pneumatic valves 176 of one or more cutting mechanisms 180. Pneumatic gauge and control 198 may be connected to an additional component of slicing apparatus 100. For example, pneumatic gauge and control 198 may control a flow of air to one or more air jets 178a and 178b.

Figure 6:
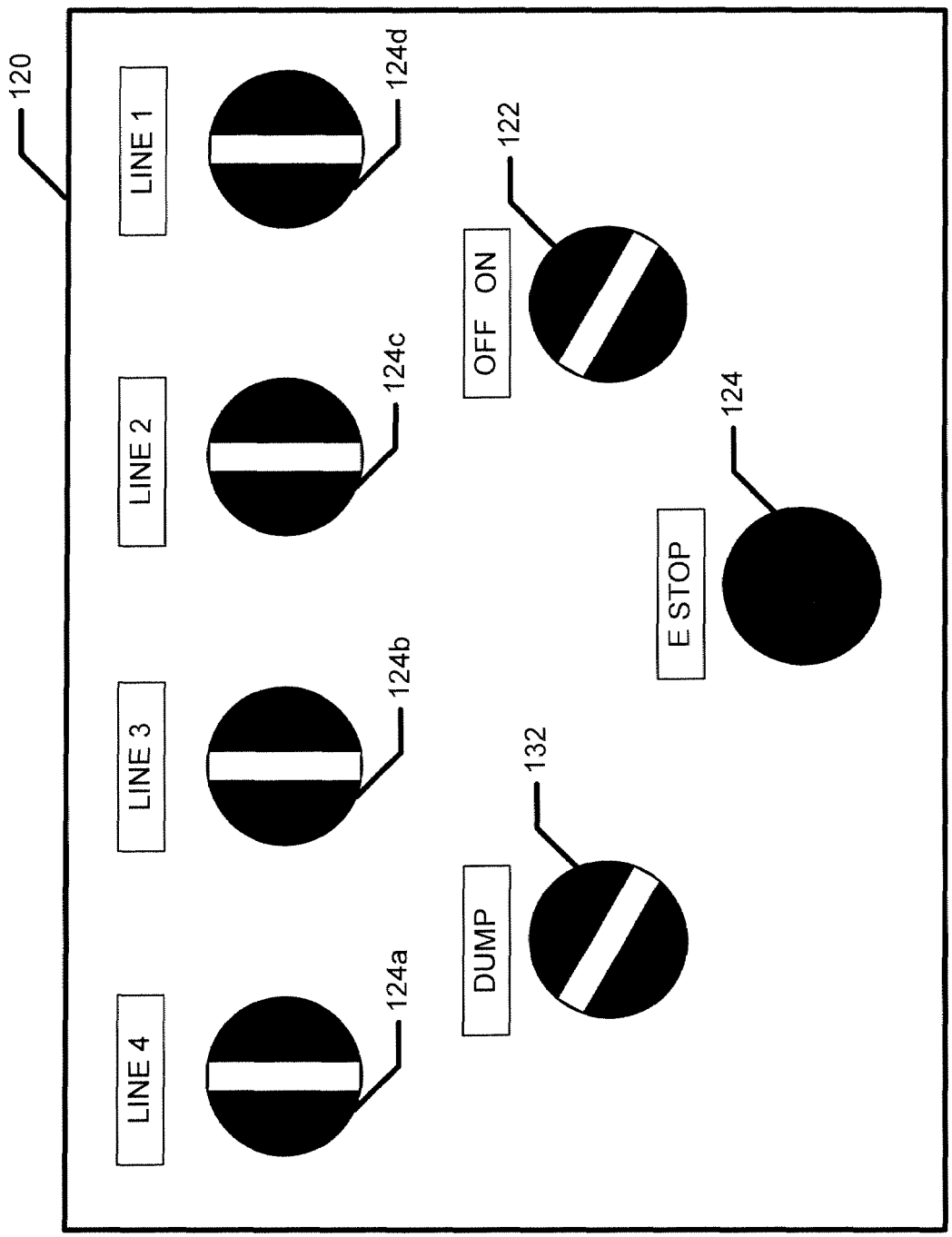
FIG. 6 is a block diagram of a control panel for a control assembly in accordance with an exemplary embodiment of the present disclosure.

Referring to FIG. 6, a block diagram of a control panel of the controller assembly in accordance with an exemplary embodiment of the present disclosure is illustrated. As shown, the control panel 120 for the controller assembly may include one or more devices to control the operation of the slicing apparatus 100. As shown, the control panel 120 may include a power controller 122, an emergency stop controller 124, a plurality of speed controllers 124 and a dump controller 132. The control panel 120 may reside in an electrical control cabinet.

The power controller 122 may control a power supply 134 of the slicing assembly 100. The power controller 122 may be an on/off switch or button, such as a twenty (20) amp on/off switch. When the power controller or button 122 is switched to an on position, the slicing apparatus 100 may be turned on. When the power controller or button is 122 is switched to an off position, the slicing apparatus 100 may be turned off.

The emergency stop controller 124 may be an on/off switch or button. The emergency stop controller 124 normally may be in the closed position. When the emergency stop controller or button 124 is pressed, the power to the motor 106 may be shut off, which in turn may cause the conveyor belts 102a and 102b to stop moving. The emergency stop controller 124 may stop the conveyor belts 102a and 102b in case of an emergency.

The dump controller 132 may release pneumatic pressure from one or more cutting mechanisms 180. This may cause the retraction of one or more counterbalanced top cutter wheels 114a into cutting mechanisms 180.

The speed controllers 124a, 124b, 124c, and/or 124d may cause one or more motors 106 to start moving or stop moving which in turn may cause one or more sets of conveyor belts 102a and 102b to start moving or stop moving. The speed controllers 124a, 124b, 124c, and/or 124d may be switches or push buttons. The one or more motors 106 may be variable speed motors. The speed controllers 124a, 124b, 124c, and/or 124d may be variable position switches that increase power linearly, logarithmically or in other increments. At a lowest or first position, the speed controllers 124a, 124b, 124c, and/or 124d may be in an off position. The speed controllers 124a, 124b, 124c, and/or 124d may each be operatively connected to two switches an on/off switch and a speed controller modulating the speed of a motor 106 between an off and full power position. The speed controllers 124a, 124b, 124c, and/or 124d may control the speed of one or more motors 106. The speed controllers 124a, 124b, 124c, and/or 124d may be potentiometers, for example, 2 k potentiometers. The speed controllers 124a, 124b, 124c, and/or 124d may controls the speed of one or more motors 106 via a DC driver 152. The motor 106 may control the speed of the conveyor belts 102a and 102b. Specifically, the speed controllers 124a, 124b, 124c, and/or 124d may control the speed of one or more motors 106, which in turn may control the speed of the pulley 108a coupled to the motor 106, which may be coupled to and may controls the speed of the third driven bottom roller 104c, via the pulley belt 110. The pulley belt 110 may, in turn, control the speed of the conveyor belts 102a and 102b. According to an exemplary embodiment, the speed of the conveyer belt may be set to a default speed of thirty-five feet per minute, but may be adjustable. The volume of product handled may depend on the nature and packaging of the product. For example, at a speed of thirty-five feet per minute seventy-five pieces of bacon may be handled per minute on each set of belts 102a and 102b. In one or more embodiments, the speed controllers 124a, 124b, 124c, and/or 124d may each be twenty-four volt power switches.

Figure 7:
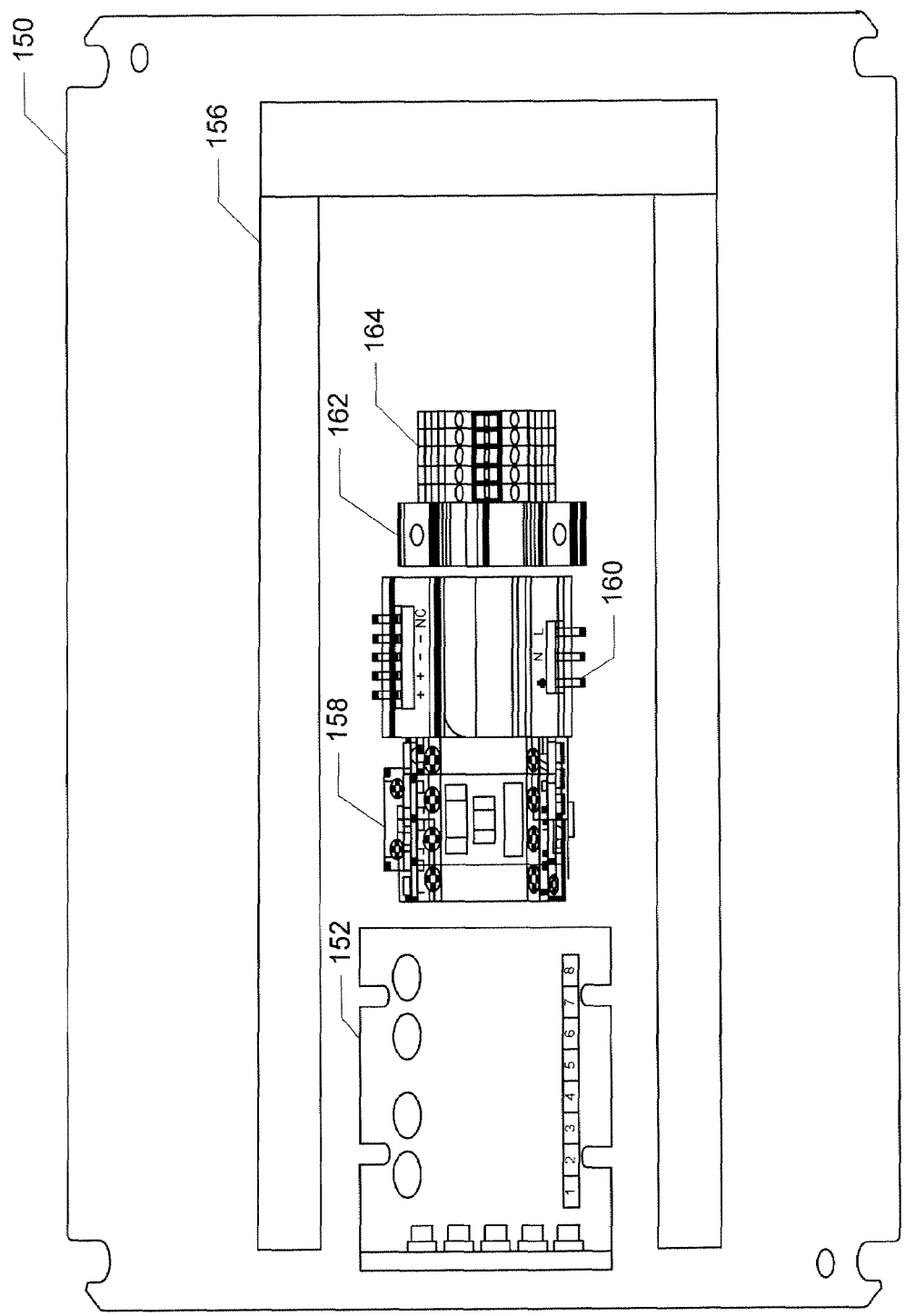
FIG. 7 a block diagram of a mounting plate of the controller assembly in accordance with an exemplary embodiment of the present disclosure.

Referring to FIG. 7, a block diagram of a mounting plate of the controller assembly in accordance with an exemplary embodiment of the present disclosure is illustrated. As shown, the control panel 120 may include a mounting plate 150. The mounting plate 150 may include a DC driver 152 (such as a Dart Controls DC driver), a din rail, and one or more wire trays 156. The din rail may include a contactor 158, a power connection 160, a fuse holder 162 for holding fuse 130, and a terminal block 164. The terminal block 164 may include an end anchor and a ground terminal.

Figure 8:
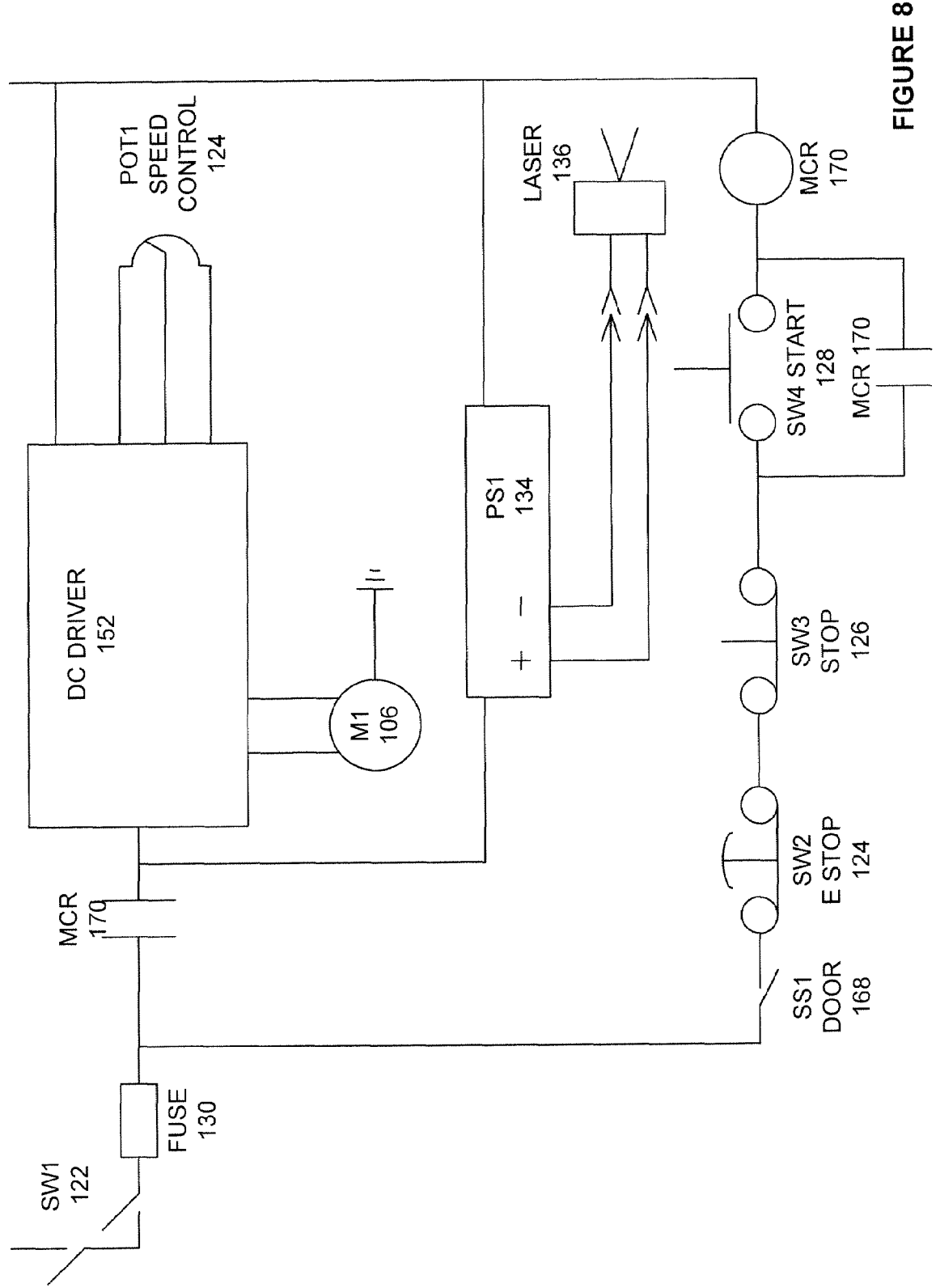
FIG. 8 is a high level circuitry schematic for a control assembly in accordance with an exemplary embodiment of the present disclosure.

Referring to FIG. 8, a high level circuitry schematic for the control panel in accordance with an exemplary embodiment of the present disclosure is illustrated. Though not shown in FIG. 1, additional components, such as, capacitors, resistors, wires, etc., may exist in the actual circuitry schematic for the control panel. The slicing apparatus 100 may be powered using a standard plug plugged into a wall outlet, e.g., a one-hundred-twenty volt alternating current, sixty hertz, fifteen ampere (120 VAC/60 Hz/15 AMP) service. The power controller 122 may control the power to the slicing apparatus 100. When the slicing apparatus 100 is turned on, e.g., the power controller 122 is pressed, power may be provided to the DC motor 106, the switches in the control panel 120, lasers 136, and an internal power supply 134. The internal power supply 134 may be used to provide power to one or more lasers 136 which are described in further detail below. As shown, the circuit also includes several controllers or switches, e.g., the emergency stop controller or switch 124 which may normally be in the closed position, the stop controller or switch 126 which is in the normally closed position, and the start controller or switch 128. Also shown, is a door switch 168, e.g., a trojan door safety switch, which may be used to ensure that an access door (not shown) to the electrical control cabinet is closed. The door switch 168 may be a safety measure to assist in ensuring that no one may improperly access the electronic components while the slicing apparatus is running. In addition, one or more master control relays (MCRs) 170 may verify that the safety circuits are in the proper position, (e.g., the door switch 168 is closed, the emergency stop controller or switch 124 is closed, the stop controller or switch 126 is closed, and the start controller or switch 128 is closed) in order to provide power to the motor 106.

Referring to FIG. 9, a method for using the slicing apparatus in accordance with an exemplary embodiment of the present disclosure is illustrated. This exemplary method is provided by way of example, as there are a variety of ways to carry out the methods according to the present disclosure. The method is described below as carried out by the slicing apparatus shown in FIGS. 1-6 by way of example, and various elements of the slicing apparatus 100 are referenced in explaining the exemplary method of FIG. 9. Each block shown in FIG. 9 represents one or more processes or methods carried out in the exemplary method. The method 200 may start in block 202 with the slicing apparatus 100 being turned on. For example, the user may press the power controller or button 122. In response to the power controller or button 122 being pushed, power may be supplied to the motor 106 and to the lasers 136. After the slicing apparatus 100 is turned on, the method 200 may proceed to block 204.

In block 204, the conveyor belts 102 may be started and if needed the speed of the conveyor belts 102 may be adjusted. For example, the user may switch one or more speed controllers 124a, 124b, 124c, and/or 124d from an off position which may cause one or more motors 106 to start thereby causing the conveyor belts 102 to move. If needed, the speed controllers 124a, 124b, 124c, and/or 124d may be adjusted to vary the speed of one or more motors 106 which in turn varies the speed of the conveyor belts 102a and 102b. In one or more embodiments, speed controllers 124a, 124b, 124c, and/or 124d may also turn on and off power to one or more belts. After starting the conveyor belts 102a and 102b, and, if needed, adjusting the speed of the conveyor belts 102a and 102b, the method 200 proceeds to block 206.

In block 206 pneumatic pressure may be applied. In one or more embodiments, a source of pneumatic pressure may be applied. One or more pneumatic controls, such as pneumatic gauges and controls 192a, may be adjusted to supply appropriate pressure to one or more cutting mechanisms 180.

In block 208, a product may be placed on the moving platform at a first end. For example, the user may place a slice of bacon or a sheet of bacon onto the conveyor belts 102a and 102b. The product may be placed on a carrier and the carrier may be placed across a set of belts. The product may be placed according to one or more laser boundary markings. The conveyor belts 102a and 102b may move the product under the safety enclosure 118 via the first opening 138a and through the cutting mechanism 180 which may cut or separate the product into two halves that may be approximately equal in size. The pneumatically controlled cutting mechanism may be aligned with a space between the belts. A cutting roller or other cutting surface may be positioned between the belts beneath the pneumatically controlled cutting mechanism and the cutting roller or other cutting surface may have a top height approximately equal to the belts. The cutting roller or other cutting surface may provide an opposing surface enabling the cutting mechanism to use pressure to separate the product. The pneumatically controlled cutting mechanism may apply sufficient pressure to separate the product without separating the product carrier.

The conveyor belts 102a and 102b may continue to move the two pieces of the cut product through the second opening 138b of the safety enclosure 118 to a second end of the moving platform where the user may retrieve the two pieces of the cut product. After the product is placed on the moving platform, is cut, and exits the safety enclosure 118, the method 200 may proceed to block 210.

In block 210, each piece of the cut product may be packaged. For example, the user (or a different user who placed the product on the moving platform) may package the half sheets of bacon. The packaged bacon may be provided to restaurants or others for sale or use. After one or more products are packaged, the method 200 may proceed to block 212.

In block 212, the conveyor belts 102a and 102b may be stopped. For example, a user may switch one or more of the speed controllers 124a, 124b, 124c, and/or 124d to an off position which may stop one or more motors 106 which, in turn, may cause the conveyor belts 102 to stop. In one or more embodiments, stopping the conveyor belts 102 may turn off power to the slicing apparatus 100. In one or more embodiments, a separate power controller may be utilized. After stopping the conveyor belts 102 and one or more motors 106, the method 200 may proceed to block 214.

In block 214, the slicing apparatus 100 may be turned off. For example, a user may press the power controller or button 122 which stops the supply of power to the motor 106 and to the lasers 136. In case of an emergency, a user may also press the emergency controller or switch 124, which may cause the motor to shut down which may cause the conveyor belts 102a and 102b to stop. In addition, the lasers 136 may turn off when the emergency controller or switch 124 is pressed. In one or more embodiments, turning off power may trigger a release of pneumatic power. In some embodiments, a separate control, such as dump controller 132 may be utilized to release pneumatic pressure.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method for cutting a meat product comprising the steps of:
    placing a meat product on a platform coupled to a motor;
    placing a product carrier between the meat product and the platform;
    operating the motor to move the meat product into contact with a cutting mechanism comprising a cutter wheel,
        wherein said cutter wheel is a round cutting blade composed of carbon steel;
    providing a cutting roller below the cutting wheel to thereby provide an opposing surface for the cutting wheel,
        wherein said cutting roller is a polyethylene cutting roller;
    applying pneumatic pressure to the cutting mechanism to hold the cutting wheel downward against the meat product as the meat product passes between the cutting wheel and the cutting roller, thereby separating the meat product into two pieces without separating the product carrier, and;
    operating the motor to move the two pieces away from the cutting mechanism for removal of the two separated pieces from the moving platform.

2. The method of claim 1, further comprising rotating the cutting roller to cause the cutting wheel to rotate.

3. The method of claim 2, wherein rotating the cutting roller comprises driving the cutting roller with the motor.

4. The method of claim 1, wherein the product is one of a strip of bacon and a sheet of bacon.

5. The method of claim 4, wherein the bacon is cooked.

6. The method of claim 1, further comprising adjusting the speed of the motor via a potentiometer.

7. The method of claim 1, wherein the cutting wheel is rotated by contact with the meat product.

8. The method of claim 1, wherein the product carrier comprises paper, interleaver paper, a foam tray or a cutting board.

9. The method of claim 1, wherein separating the meat product comprises splitting the meat product by pressure.

10. The method of claim 1, wherein the polyethylene cutting roller is a polyoxymethylene roller or a polyacetal roller.

11. The method of claim 1, wherein the cutting roller is a knurled roller.

* * * * *

UNITED STATES PATENT AND TRADEMARK OFFICE
CERTIFICATE OF CORRECTION

| | | |
|---|---|---|
| PATENT NO. | : 8,479,623 B2 | Page 1 of 1 |
| APPLICATION NO. | : 12/364003 | |
| DATED | : July 9, 2013 | |
| INVENTOR(S) | : Bridges | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 873 days.

Signed and Sealed this
Twenty-seventh Day of January, 2015

Michelle K. Lee
*Deputy Director of the United States Patent and Trademark Office*